Nov. 8, 1966     P. A. VANCE, JR     3,284,736
TEMPERATURE-RESPONSIVE THERMALLY ADJUSTABLE CONTROL DEVICE
Filed April 17, 1964     2 Sheets-Sheet 1
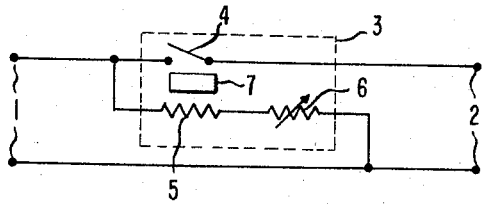
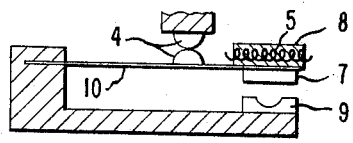
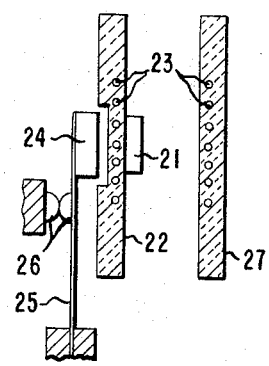
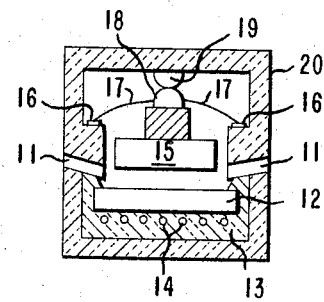
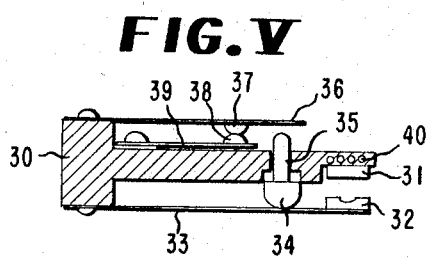
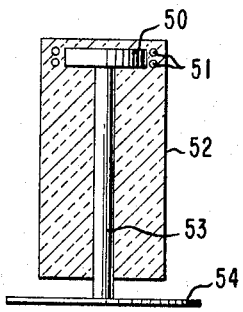
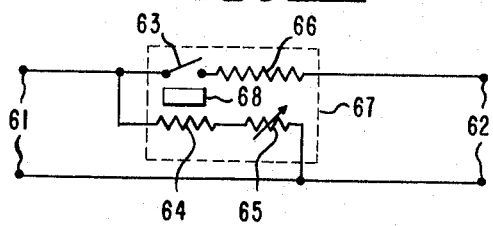
INVENTOR
PAUL A. VANCE JR.
BY
ATTORNEY Nov. 8, 1966    P. A. VANCE, JR    3,284,736
TEMPERATURE-RESPONSIVE THERMALLY ADJUSTABLE CONTROL DEVICE
Filed April 17, 1964    2 Sheets-Sheet 2
FIG. VIII
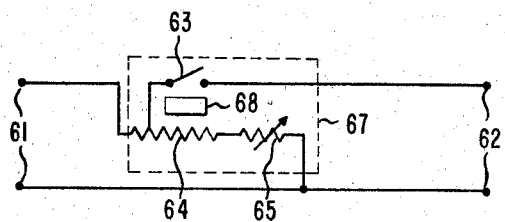
FIG. IX
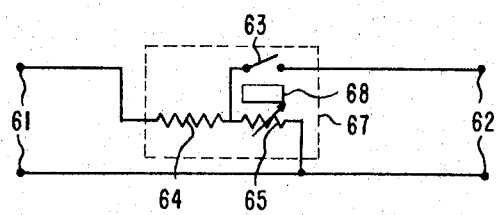
FIG. X
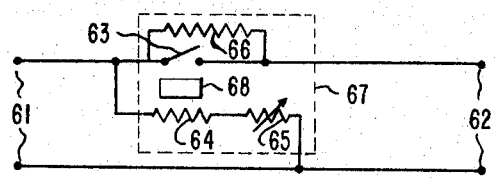
*INVENTOR*
PAUL A. VANCE JR
BY
*ATTORNEY*

United States Patent Office 3,284,736
Patented Nov. 8, 1966

3,284,736
TEMPERATURE-RESPONSIVE THERMALLY ADJUSTABLE CONTROL DEVICE
Paul A. Vance, Jr., Newark, Del., assignor to E. I. du Pont de Nemours and Company, Wilmington, Del., a corporation of Delaware
Filed Apr. 17, 1964, Ser. No. 360,667
5 Claims. (Cl. 335—146)

This invention relates to a temperature-responsive control device and is particularly concerned with an adjustable temperature-responsive control device in which adjustment is accomplished by thermal means.

Adjustable control devices are employed in diverse fields of modern technology for a variety of purposes including regulation of liquid flow, control of heating and cooling devices, and the like. Most such devices employ a bimetallic element as the temperature-responsive element and may include an associated magnetic element and/or intermittent heating element to improve operation. However, adjustment of the temperature of operation is obtained by mechanical means. Temperature-responsive devices have also been proposed in which operation depends upon decrease in magnetization of a magnetic element at the Curie point [Straubel, Z. angew. Phys., 11, 172 (1959); and Schwarzkopf, U.S. Patent 2,016,100], or upon change in properties of an element which undergoes at a temperature below its Curie point a reversible first-order solid-phase-to-solid-phase transition with maintenance of crystal symmetry (U.S. Patent No. 3,126,492 to T. J. Swoboda). In these latter devices, the temperature of operation depends upon the chemical composition of the magnetic element.

It is an object of this invention to provide a thermally adjustable control device which has the criteria of ease of adjustment, reproducibility and stability of set point, and linearity in response, i.e., uniformity in the change in response temperature produced by an adjustment of given magnitude regardless of the temperature at which the device is set to operate. These criteria are readily met by the adjustable control device of the present invention. It is a further object to provide a temperature control device than can be set for any desired temperature of operation by regulating the amount of heat supplied to a component which undergoes a first-order transition within a specific narrow temperature range. These and other objects will become apparent hereinafter.

The present invention provides a temperature-responsive control device in which adjustment to the desired temperature of operation is obtained by thermal means. This thermally adjustable control device comprises:

(a) A frame or support, (b) A temperature-responsive element comprising a substance (sometimes hereinafter referred to as transition material) which undergoes a first-order solid-phase-to-solid-phase transition within a narrow temperature range below its Curie point with a sharp change in its magnetic saturation induction and at a temperature above the desired operating range of said control device, (c) Adjustable thermal means for maintaining an adjustable temperature differential between the temperature of said temperature-responsive element and the ambient temperature, and (d) Electrical switch means controlling an electrical circuit, responsive to changes in the magnetic state of said temperature-responsive element.

In one embodiment, heat energy is continuously supplied to the temperature-responsive element by the adjustable thermal means. Since the thermal means supplying the heat is adjustable, any desired amount of heat may be supplied. The heat so supplied keeps the temperature of the temperature-responsive element above the temperature of the environment whose temperature is to be regulated. This difference in temperature causes heat to be dissipated from the temperature-responsive element to the environment. When the heat dissipation lowers the temperature of the temperature-responsive element through the first-order transition point, the temperature-responsive element becomes non-magnetic, closing a magnetically responsive electrical switch which is wired by circuitry to the environmental heating control. As the environment becomes warmer, the heat loss from the temperature-responsive element becomes less and the effect of the thermal heating means raises the temperature of said element through its first-order transition point, whereupon said element becomes magnetic, causing the electrical switch to open, which in turn breaks the circuit to the environmental heating control.

Thus, the temperature of the temperature-responsive element is governed by the combined effect of the environmental temperature and the adjustable thermal means. By adjusting the thermal means, the temperature at which the environment is desired to be maintained can be varied, for the more heat supplied by the adjustable thermal means, the cooler the environmental temperature, i.e., the greater the difference between the temperature of the temperature-responsive element and the environment.

Of course, the electrical switch means can be arranged to provide for closing, instead of opening, on the temperature rise and this arrangement is especially useful in control of air conditioners, and refrigerators.

For sharpness in adjustment, it is of course desirable that uncontrolled variations in heat transfer among the temperature-responsive element, the heating element and the environment be held to a minimum, and for this reason the devices of this invention sometimes include thermal insulation partially or completely surrounding the temperature-responsive element and heater. It is also desirable in some instances to provide fins or other means for improving heat transfer with the environment.

The invention is set forth in further detail below with reference to the accompanying drawings wherein:

FIGURE I is a schematic representation of an electrical circuit employing the thermally adjustable control device of the present invention, FIGURES II–V depict schematically several embodiments of the thermally adjustable control device, FIGURE VI depicts an alternate arrangement for the thermally responsive element of the device, and FIGURES VII–X illustrate electrical circuit for further embodiments of the device.

In one embodiment of the invention, the electrical switch means is made responsive to the change in the magnetic state of the temperature-responsive element by providing the electrical switch means with a magnet responsive to said change in the magnetic state of the temperature-responsive element. The element and the magnet are mounted on supports which cooperate to permit relative motion of said element and magnet toward and away from each other as the element changes its magnetization. Electrical contacts are mounted on said supports to open and close as the supports cooperate.

Although it would appear simplest and therefore most desirable to have one contact of the electrical switch means included on the movable support carrying magnet or temperature-responsive element, this arrangement tends to be unsatisfactory in practice because the force holding the two contacts of the switch together varies as the mutual attraction between magnet and temperature-responsive element varies as a result of changes in the environmental temperature. A preferred arrangement is one in which both contacts of the switch means are mounted separately from the element supports so that contact is maintained under uniform pressure until the attraction between magnet and temperature-responsive element is relatively great, whereupon contact is abruptly broken. One such arrangement is illustrated in FIGURE V.

The materials employed as the temperature-responsive element in the control devices of this invention are possessed of the characteristic of undergoing a sharp and reversible increase in saturation induction with change in temperature in the course of a first-order solid-phase-to-solid-phase transition. In a typical element, the sharp change between magnetic and non-magnetic states takes place over a total temperature interval of about 2–10° C. and is a linear function of the temperature over approximately the central 80% of this temperature range. For convenience, the midpoint of the range is usually referred to as the temperature at which the change between magnetic and non-magnetic states occurs. However, the temperature at which a permanent magnet will attract or be attracted to the temperature-responsive element will not necessarily coincide with this midpoint temperature, but will depend inter alia on the distance separating the magnet and the element and on the force required to initiate motion of the magnet and/or element. A material is usually selected for the temperature-responsive element which changes in magnetic state to a degree sufficient for operation of the device at a temperature of 1–25° C. or more above the desired operating temperature of the device.

The principles underlying construction of thermally adjustable control devices according to this invention will be more fully understood by reference to the accompanying figures. The wiring diagram of FIG. I illustrates a wired circuit containing the control device of this invention within the dotted box 3. The control device 3 is connected in series in an electrical circuit between a source of power 1, such as a battery or generator, and a motor, heater, or circulating pump 2 whose operation is being controlled by the temperature-responsive control device 3. The heating element 5 of the device is also powered by the source of power 1 and the current flowing therethrough is controlled by an adjustable control means 6, such as a variable resistance, inductance, transformer, or the like. This adjustable control means enables the control point of the device to be changed as desired. As explained above, the temperature-responsive element 7 changes its magnetic saturation induction, tripping switch 4.

One embodiment of the control device of this invention is illustrated in FIG. II wherein the temperature-responsive element 7 is mounted on a flexible lever arm or spring 10 adjacent to a magnet 9. The lever arm also carries one of the contacts 4 comprising the electrical switch, the other contact being mounted on a fixed support adjacent thereto. A heater 5 maintains a desired temperature differential between the ambient temperature and the temperature of the temperature-responsive element 7. This heater preferably is embedded in insulating material 8 in contact with the temperature-responsive element to provide greater sensitivity in adjustment. It will be apparent that when the temperature-responsive element is in a magnetic state, it will be attracted to magnet 9 thereby opening contacts 4 and breaking the circuit of which these contacts are a part. Conversely, when thermally responsive element 7 is in its non-magnetic state, the situation will be as depicted in FIG. II with the contacts closed and current flowing through the switch.

A somewhat different arrangement is illustrated in FIG. III wherein the temperature-responsive element 21 is mounted within a chimney duct or pipe 27 to improve circulation of air over the element. The heater 23 is embedded in the chimney wall. The chimney is usually constructed of a thermally insulating material. In one embodiment of this device, the interior wall of the chimney 22 adjacent to the element is composed of a thermally conducting material to improve heat transfer between the air or other fluid passing through the chimney and element on the one hand, and the heater and the element on the other. The remaining parts of the device, which function as described in connection with the corresponding parts of FIG. II, are the magnet 24 mounted on the flexible reed 25, and the electrical contacts 26.

A further embodiment of this thermally responsive control device is depicted in FIG. IV. In this embodiment the parts are all enclosed within an electrically non-conducting container 20. The thermally responsive element 12 is mounted on a bed of thermally insulating material 13 in which is embedded the heater 14. The magnet 15 is supported above the thermally responsive element by spring members 17 which also serve to carry current from the movable contact 18 via the conducting ring 16 to a conductor leading outside the container. The fixed contact 19 is mounted on the interior of the container, with suitable electrical connection to the exterior. Ports 11 are provided in the walls of the container to permit circulation over the thermally responsive element 12 of the medium, to the temperature of which the device is responding.

In another embodiment, illustrated in FIG. V, the thermally responsive element 31 and heating element 40 are carried on a support member 30. The support 30 also carries a reed or spring 33 having a magnet 32 mounted at its free end. Electrical contacts 37 and 38 comprising the switch are mounted on reeds 36 and 39, respectively, the motion of reed 33 being transmitted to reed 36 by the shouldered pin 34. The pin 34 is mounted in a recessed hole 35 so that the depth of the recess prevents excessive motion of the pin thereby governing the extent to which the electrical contacts are separated and preventing contact between thermally responsive element 31 and magnet 32. This latter feature is desirable since it leads to greater uniformity in temperature control.

An alternative arrangement for heater and insulating material surrounding the thermally responsive element is depicted in FIG. VI. Such an arrangement is particularly adapted for use in switches of the types shown in FIGURES II to V and is used to reduce the effect of slight variations of the environmental temperature on the temperature-responsive element. Such variations in temperature may be caused, e.g., by air velocity past the element. Thus, the arrangement shown in FIG. VI stabilizes the temperature of the element. In this arrangement, the thermally responsive element 50 is in contact with a rod of thermally conducting material 53 and both are embedded in thermal insulation 52. The rod projects beyond the thermal insulation and may carry at its outer end a plate or disk 54, which preferably has a higher thermal conductivity than the rod. Embedded in the thermal insulation adjacent to the thermally responsive element is the heating element 51. The rod and disk can be constructed of any thermally conductive material such as copper, iron, brass, steel, and the like.

A thermally adjustable control device, according to the present invention, was constructed as illustrated in FIG. V. The over-all dimensions of the device were 2" x 0.5" x 0.5". The thermally responsive element 31 was fabricated from a manganese-chromium-indium antimonide containing (in atom percent) 63.4 Mn, 3.24 Cr, 1.66 In and 31.7 Sb as a disk 7/16" in diameter and 40 mils thick. This element was rigidly mounted on support member 30. Within the support adjacent to the thermally responsive element, a small electric heater 40 was installed having a resistance of about 10 ohms. Magnet 32 was 0.31" in diameter and 0.20" in maximum thickness. It had the composition (by weight) 13.5% Ni, 24% Co, 8% Al, 3% Cu, and 51% Fe. The magnet was mounted at one end of flat spring 33, the other end of which was fastened to the support member. The spring had a free length (between support and magnet) of 1.75″, a width of 0.25″, and a thickness of 10 mils. To adjust this spring for proper tension, a rectangular hole was cut into the end adjacent the support member for a length of 0.625″ leaving a 20 mil width of spring remaining on each side of the hole. Separation between magnet 32 and thermally responsive element 31 was 35 mils when the element was in its less magnetic state and 6 mils when the element was in its more magnetic state. Motion of spring 33 was transmitted by shouldered pin 34 to spring 36 bearing contact 37 of the electrical switch means. Spring 36 was 1.125″ in length (between support member and point of contact of pin 35), 0.188″ in width and 12 mils in thickness. A rectangular hole was cut into the end of the spring next to the support member for tension adjustment. This hole measured 0.125″ along the length of the spring. A 20-mil width of spring remained on each side of the hole. Contact 38 was mounted on flat spring 39 which was 0.625″ in length between point of attachment to the support and the contact. This spring was 0.188″ wide, 6 mils thick and had a rectangular hole cut centrally of the spring adjacent to the point of attachment to the support. A spring width of 40 mils remained on each side of the hole. The hole dimension along the length of the spring was 0.25″. Preliminary testing indicated that set point could be adjusted by adjustment of heater current.

This thermally adjustable control device was used as a thermostat to control air temperature with results as shown in Table I. It is apparent from the table that set point can be varied over a wide range by regulation of current through the heater.

TABLE I

*Air temperature control*

| Heater current (milliamperes): | Average air temperature [1], °F. |
| --- | --- |
| 15 | 87.1 |
| 30 | 84.4 |
| 45 | 81.3 |
| 60 | 78.9 |

[1] Air velocity: 25 ft./min.; rate of temperature change: 1° F./hr.

In the devices of this invention there may also be present an intermittent heater for thermal anticipation to decrease temperature fluctuation. Typical circuits for such a device are depicted in FIGS. VII–X. In these figures, a source of power 61 is connected to a device 62 whose operation is to be controlled through the thermally adjustable control device 67. Control device 67 includes electrical switch means 63, the temperature-sensitive element 68, adjustable heater 64, and the adjustment therefor 65. FIG. VII includes intermittent heater 66 for thermal anticipation. In FIGS. VIII and IX all or part of resistor 64 also acts as the heater 66. FIG. X illustrates a circuit used for cooling devices such as air conditioners. In FIG. X, resistor 66 must be of high resistance to prevent operation of the device 62 when switch 63 is open.

Operating characteristics of the control devices of this invention are largely dependent upon the force-distance relationship for magnet and temperature-responsive element, and on the characteristics of the means causing separation thereof. The arrangement is preferably such that the contact points are separated or brought together abruptly to minimize arcing. Usually relatively small forces of 5–10 g. are required for operation and requisite characteristics can be obtained using relatively thin, e.g., 8 mils in thickness, beryllium-copper stock for fabrication of springs which constitute supports for magnet, temperature-responsive element, and/or contacts. The desired strength of these springs is obtained by appropriate choice of specific width over the whole or a part of the length of the spring. Alternatively, the magnet and/or temperature-responsive element can be mounted on rigid pivoted members and the requisite force for separation provided by coil springs, air cushions, or the like.

The material employed for the electrical contacts in the thermally responsive devices of this invention can be any of the usual contact materials. When relatively small forces are required for operation, it is desirable to use such contact materials as gold-silver-platinum (69–25–6), silver-palladium (50–50), and silver-gold (90–10). When stronger forces are available, i.e., forces in the range of 15–30 g. or more, various contact materials containing higher proportions of silver, up to and including 100% silver, can be employed. Mercury tilt switches or other enclosed switches can be employed in place of the open contact type of switch depicted in the figures. In view of the relatively large motion possible for the supports of magnet or thermally responsive element, tilt switches need not be as sensitive as the tilt switches used with bimetallic thermostats.

Any rigid material, preferably electrically insulating in character, can be employed for mounting and/or enclosing the elements comprising the devices of this invention. For ease in fabrication, the material is preferably one which can be molded to the desired shape and size with minimum of finishing treatments required. Suitable materials are nylon, polymethyl methacrylate, polyacetal resin, phenol-formaldehyde resins and urea-formaldehyde resins.

The substances employed as temperature-responsive elements in the devices of this invention are possessed of the characteristic of abruptly changing in a controllable manner their saturation induction, with changing temperature, from a non-magnetic to a magnetic state in the course of the first-order transistion from one solid state phase to a second solid state phase. Preferably, this change in phase occurs with no change in crystal symmetry. It is preferred that this change be from an anti-ferromagnetic state on the one hand to a ferromagnetic or ferrimagnetic state on the other.

A first-order transition is one in which a discontinuity occurs in the first derivatives of the Gibbs free energy function. For example, there are discontinuities in the first derivative with respect to temperature, i.e., entropy, with respect to pressure, i.e., in volume, and for a magnetic material with respect to magnetic field, i.e., in magnetization. This first-order transition is not to be confused with a second-order transition. In a second-order transition, the energy, volume, and magnetization change continuously but the temperature derivatives of these quantities have singularities. The Curie point in a magnetic material is an example of a second-order transition.

Further discussion of first- and second-order transitions is found in Swalin, "Thermodynamics of Solids," John Wiley and Sons, Inc., New York, 1962, pp. 72–73, and in "Phase Transformations in Solids" (symposium at Cornell University, August 23–28, 1948), John Wiley and Sons, Inc., New York, 1951, Chap I, by L. Tisza, pp. 1–2.

Preferred first-order transition materials show a change in saturation induction of at least five-fold and those showing ten-fold or more change are especially preferred.

A variety of substances are useful as the first-order transition material of this invention.

For example, compositons described in U.S. Patent 3,126,347 to T. J. Swoboda are useful. These compositions contain (a) at least two transition elements from Periodic Table Groups V–B, VI–B and VII–B, i.e., V, Cr, Mn, Nb, Mo, Ta, W, and Re, of which at least one of said two elements is from the first row of said transition elements, i.e., V, Cr, and Mn, and (b) at least one Group V–A element selected from As or Sb, which constitutes 5–40 atom percent of the total composition, and preferably 5–35 atom percent. Nitrogen, phosphorus and bismuth may also be present. The compositions may contain other elements from Groups II–IV in an amount not more than 30 atom percent. Such elements include cadmium, gallium, indium, lead, thallium, tin, zirconium, scandium, yttrium, magnesium, and zinc. Ordinarily, one of the transition metals enumerated above will constitute the major proportion of the transition metal content of the composition while the second transition metal will be present in minor proportion. However, in no case will the content of the second transition metal be less than 0.1 atom percent based on the total composition. For use in the present invention, compositions containing manganese and antimony are preferred. The Periodic Table referred to herein is the one appearing in Deming's "General Chemistry," John Wiley and Sons, Inc., 5th ed., chap. 11.

Iron-rhodium alloys (Fe-Rh) and iron-rhodium alloys containing up to 20 atom percent of at least one other element (Fe-Rh-M) are also useful as the first-order transition material used in the device of this invention. Suitable Fe-Rh alloys include those described by Fallot, Revue Scientifique 77, 498 (1939); and Kouvel et al., General Electric Research Report No. 61–RL–2870M. Suitable Fe-Rh-M alloys are described in U.S. Patents 3,140,941, 3,140,942, and 3,144,325, issued in the name of P. H. L. Walter; and U.S. Patent 3,144,324, issued in the name of T. A. Bither. These latter compositions may be represented by the formula $Fe_aRh_b[xM]_c$, wherein M represents (1) at least one element selected from beryllium, magnesium, aluminum, gallium, indium, silicon, germanium, tin, lead, phosphorus, arsenic, antimony, bismuth, sulfur, selenium, or tellurium, and $x$ is an integer from 1–6 and generally 1–2; (2) at least one transition metal of atomic number 39–44, 46–48, and 57–80, inclusive, and $x$ is an integer from 1–6 and generally from 1–2; (3) at least one transition metal of atomic number 21–25, 27–30, inclusive, and $x$ is an integer from 1–6 and generally from 1–2; or (4) at least one rare earth metal of the lanthanum or lanthanide series of the Periodic Table of the elements of atomic numbers 58–71, inclusive, and $x$ is an integer from 1–14, and generally from 1–3. In all these iron-rhodium-metal alloys, $a$ and $b$, which can be alike or different, are numbers ranging from 0.8–1.2, and $c$ is a number ranging from 0.01–0.20, and in this instance when $x$ is 2, the requisite $c$'s can be alike or different, but still must fall in the indicated range. These subscript numbers refer to the atomic proportions of the elements in the final alloy. M can be different within the same defined group when $x$ is greater than 1.

Further compositions which can be employed as the first-order transition material in devices of this invention are those having a tetragonal crystal structure and containing manganese in an amount of at least 40 atom percent, a second metallic component selected from iron, cobalt, nickel, copper, and zinc, in an amount of 0.6–25 atom percent, and at least one of arsenic, antimony and bismuth in an amount of 25–40 atom percent. Additional components selected from the elements of Groups III-A, III-B, IV-A, or IV-B, in an amount of 0–25 atom percent may also be present. These compositions are described more fully in U.S. Patent 3,126,345 to T. J. Swoboda.

Still other compositions useful in the present invention are described in U.S. Patent 3,126,346 to T. A. Bither. These compositions have a tetragonal crystal structure and contain a single transition metal selected from chromium, manganese, iron, cobalt, or nickel in an amount of 61–75 atom percent, and from 25–39 atom percent of at least two elements selected from gallium, germanium, selenium, tellurium, arsenic, antimony and bismuth, of which at least the major atoms percent consists of arsenic, antimony, and/or bismuth.

Still other useful compositions can be represented by the formula $Mn_{2-x-y}T'_xT''_ySb_zIn_a$, where T' is chromium and/or vanadium, T'' is one or more of iron, cobalt, nickel, and copper, $x$ is 0.003–0.25, $y$ is 0.003–0.25, $z$ is 0.50–1.00 and $a$ is 0–0.50. These compositions are more fully described in U.S. Patent 3,241,952 issued in the names of W. W. Gilbert and T. J. Swoboda.

Processes for preparing many of the compositions useful as the first-order transition material of this invention are described in the foregoing patents and in U.S. Patent 3,196,055, issued in the name of W. W. Gilbert.

The range of temperature over which the change in saturation induction occurs can readily be minimized by preparing the composition in single crystal form or by quenching and annealing as taught by W. W. Gilbert in aforesaid U.S. Patent 3,196,055. This process involves quenching the molten composition to a temperature below its solidification temperature, annealing at a higher temperature below the solidification temperature and cooling slowly. Optionally, a chalcogen-reactive reagent, e.g., aluminum, may be added to the molten composition prior to quenching.

This process produces materials in which 80% of the transition occurs within a temperature interval of less than 6° C. Transition temperature ranges for a few of the compositions used as the first-order transition material of this device are summarized in the following Table II.

TABLE II

| Composition (atom percent) | Transition Temp. Range (80%) (° C.) | Transition Temp. (° C.) |
| --- | --- | --- |
| 1. Mn, 63.7 Cr, 3.3 Sb, 31.3 In, 1.7 | 5.0 | 34.6 |
| 2. Mn, 64.62 Cr, 1.88 Sb, 31.82 In, 1.68 | 4.2 | −40.7 |
| 3. Mn, 65.82 V, 0.86 Sb, 31.65 In, 1.67 | 2.0 | −144.5 |

Preferably the transition temperature range will be less than 4 degrees and most preferably less than 2 degrees.

Any permanently magnetic material is suitable for the magnetic element provided it retains its magnetism at the temperature intended for use. Iron alloys, such as alloys containing aluminum (8–10%), cobalt (12.5–24%), copper (3–6%), nickel (13.5–17%), balance iron, are entirely suitable. Satisfactory results are also obtained with magnet steels, such as the alloy containing (by weight) 36% Co, 7% W, 3.5% Cr, 0.9% C, balance Fe; as well as aluminum-iron-nickel and cobalt-iron-vanadium alloys. Oxide compositions such as the ferrites, e.g., barium ferrite and barium chromium ferrite are also suitable, and useful magnets can be fabricated from acicular iron, iron-cobalt, or iron-nickel particles. Other suitable materials are well known in the art—see, for example, Bozorth, "Magnetic Materials" [D. Van Nostrand Co., Inc., New York (1951)], especially chapter 9.

The magnets are formed by conventional melt-casting or sintering techniques and may be heat-treated in known manner to develop desired properties. Magnets may also be formed by dispersing particles of the magnetic composition in a binder such as a polymer composition, e.g., a polyvinyl chloride composition, forming the dispersion to the desired shape and hardening by evaporation of solvent, if solvent be present, or by cooling if a heat-softened composition has been used.

The magnet usually is formed in the shape of a wafer or disk which may be grooved on one surface to form poles. The dimensions of the magnet are not critical, provided there is sufficient magnetic material to afford a field of the desired strength. The dimensions of the broad faces preferably correspond approximately to the dimensions of the face of the temperature-responsive element.

As is apparent throughout the specification, the devices of this invention find utility in many temperature control applications, e.g., they may be used as thermostats to control the temperature of a fluid environment. They may be used to control heating plants for heating homes and office space, or they may be used to control the flow of chemicals to curtail the effects of endothermic or exothermic reactions. Other uses are self-evident.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A thermally adjustable temperature-responsive control device comprising, in combination, a frame having an insulated conduit through said frame, a temperature-responsive element which undergoes a first-order solid-phase-to-solid-phase transition within a narrow temperature range below its Curie point with a sharp change in its magnetic saturation induction and mounted within said conduit, magnetic means positioned to move to and from a first position and a second position closer to said element, spring lever means connecting said frame and said magnetic means for moving said magnetic means to and from said first and second positions, a first electrical contact mounted on said spring lever means, a second electrical contact mounted on said frame and positioned to contact said first contact when said spring lever means is in one of said first and second positions, and adjustable thermal means comprising a continuous electrical heater embedded in said conduit closely adjacent said element, and means to adjust the heat output of said heater.

2. A thermally adjustable temperature-responsive control device, comprising, in combination, an enclosed nonconducting frame having a plurality of apertures, movable spring means mounted within said frame for movement between a first and a second position, a first electrical contact mounted on said frame, a second electrical contact mounted on said movable means for abutment with said first contact when said movable means is in one of said positions, magnetic means mounted on said movable means, a temperature-responsive element which undergoes a first-order solid-phase-to-solid-phase transition within in a narrow temperature range below its Curie point with a sharp change in its magnetic saturation induction, said element mounted within said frame to force said spring means from one position to the other by magnetic attraction, an insulated support on said frame supporting said element, and adjustable thermal means comprising a continuous electrical heater embedded in said insulated support closely adjacent said element, and means to adjust the heat output of said heater.

3. A device for stabilizing the temperature of a temperature-responsive element which comprises, in combination, a thermally insulated solid member, a temperature-responsive element embedded within said solid member which undergoes a first-order solid-phase-to-solid-phase transition within a narrow temperature range below its Curie point with a sharp change in its magnetic saturation induction, adjustable thermal means for continuously supplying heat to said element positioned closely adjacent said element, and thermally conducting means within said solid member extending from said element through the surface of said solid member.

4. The device of claim 3 wherein said adjustable thermal means comprises an electrical heater and means to adjust the heat output of said heater, and wherein the thermally conducting means comprises a rod having a fin positioned on the portion of said rod outside said solid member.

5. A thermally adjustable control device responsive to the temperature of a medium surrounding it comprising in combination an insulated frame open to said medium to provide circulation of said medium throughout said frame, a temperature-responsive element which undergoes a first-order, solid-phase-to-solid-phase transition within a narrow temperature range below its Curie point with a sharp change in its magnetic saturation induction, located within said frame for maximum heat transfer from said medium to said element, magnetic means within said frame, said element and magnetic means connected to said frame for relative movement toward and away from each other, electrical switch means positioned to open and close an electrical circuit in response to said movement, a continuous electrical heater embedded in insulating material positioned closely adjacent and in fixed relation to said element, and means cooperating with said heater to adjust the heat output thereof.

References Cited by the Examiner

UNITED STATES PATENTS 3,009,047 11/1961 Simmons _____ 200—88 X
3,206,573 9/1965 Anderson et al. _____ 200—88

BERNARD A. GILHEANY, *Primary Examiner.*

R. N. ENVALL, JR., *Assistant Examiner.*